June 7, 1955 R. POTOCNIK 2,710,049
CENTER ARM REST
Filed Oct. 24, 1952 3 Sheets-Sheet 1

INVENTOR
Rudolph Potocnik
BY
Willet, Helwig & Baillio
ATTORNEYS

June 7, 1955   R. POTOCNIK   2,710,049
CENTER ARM REST
Filed Oct. 24, 1952   3 Sheets-Sheet 2
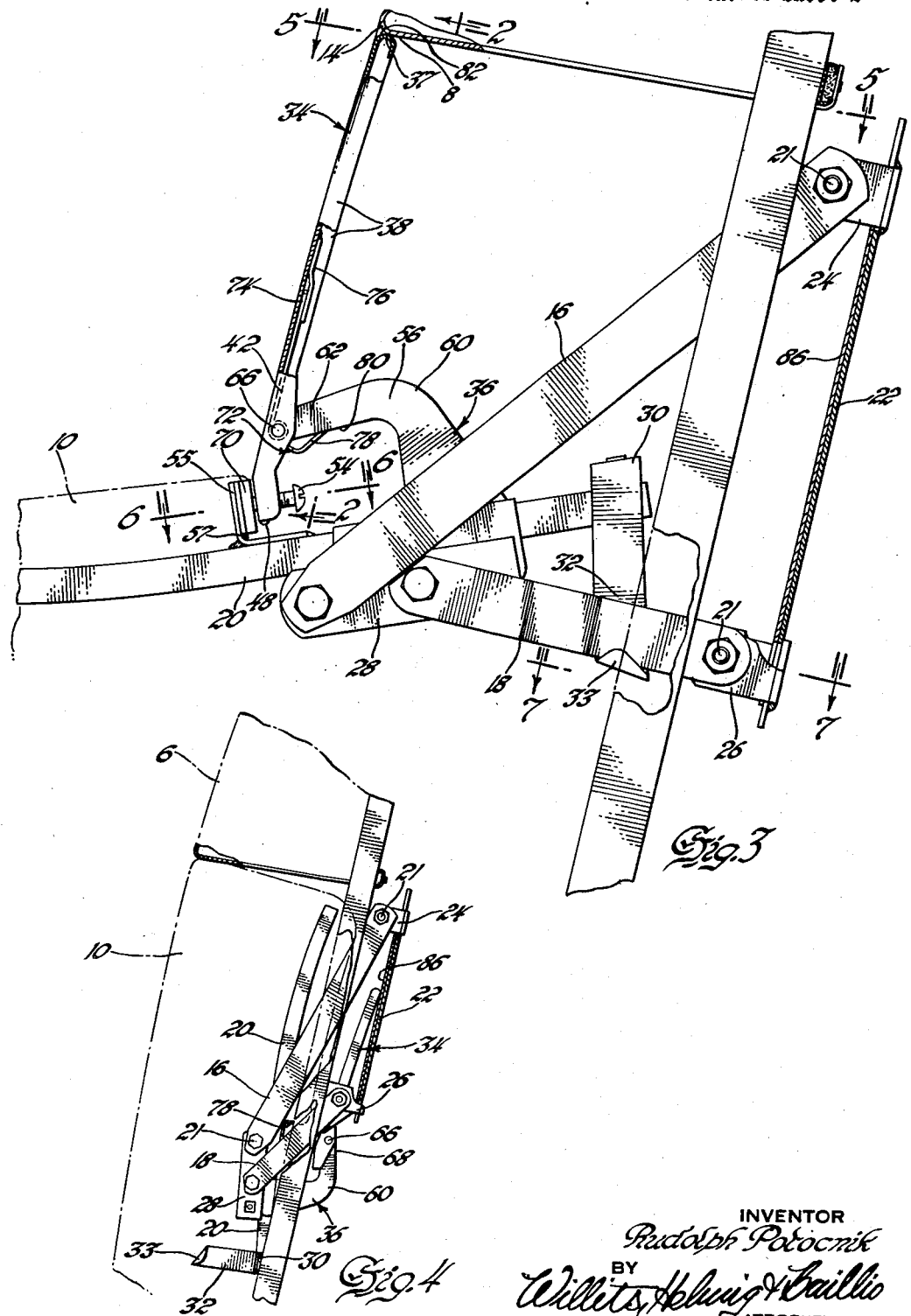
INVENTOR
Rudolph Potocnik
BY
Willets, Helwig & Baillio
ATTORNEYS June 7, 1955   R. POTOCNIK   2,710,049
CENTER ARM REST
Filed Oct. 24, 1952   3 Sheets-Sheet 3
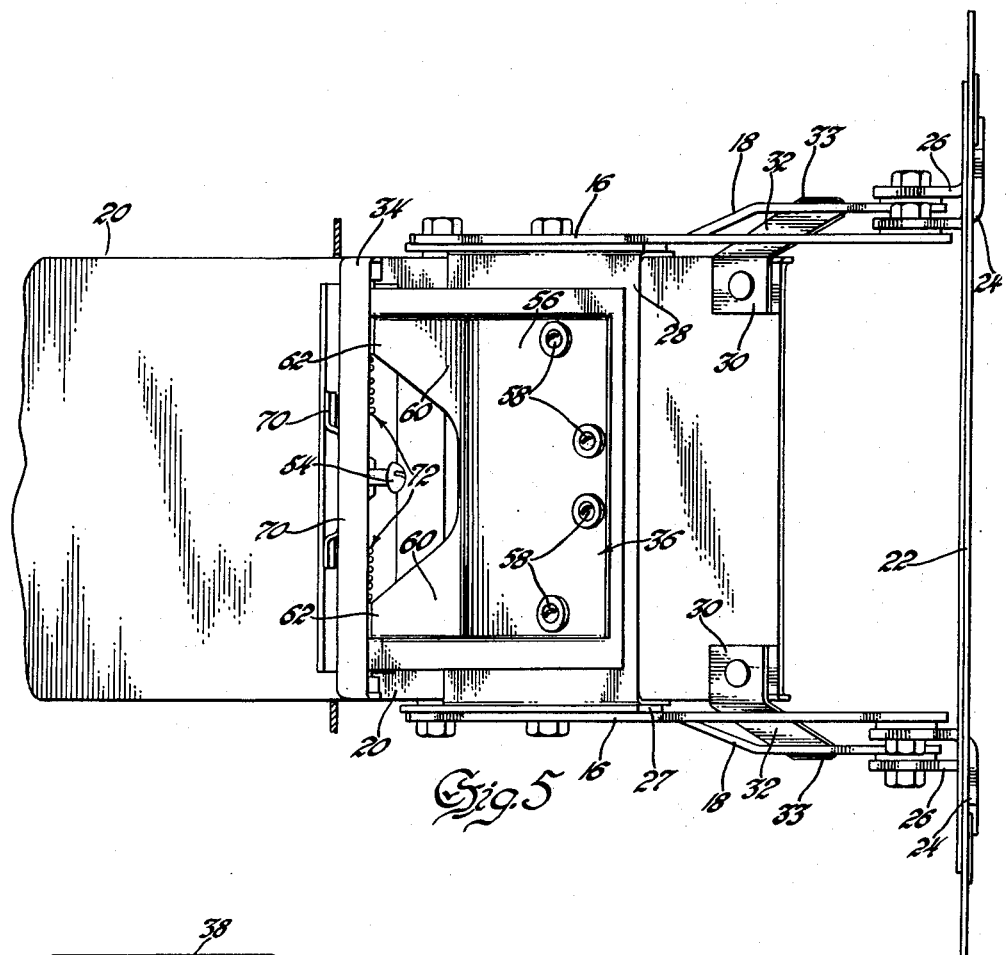
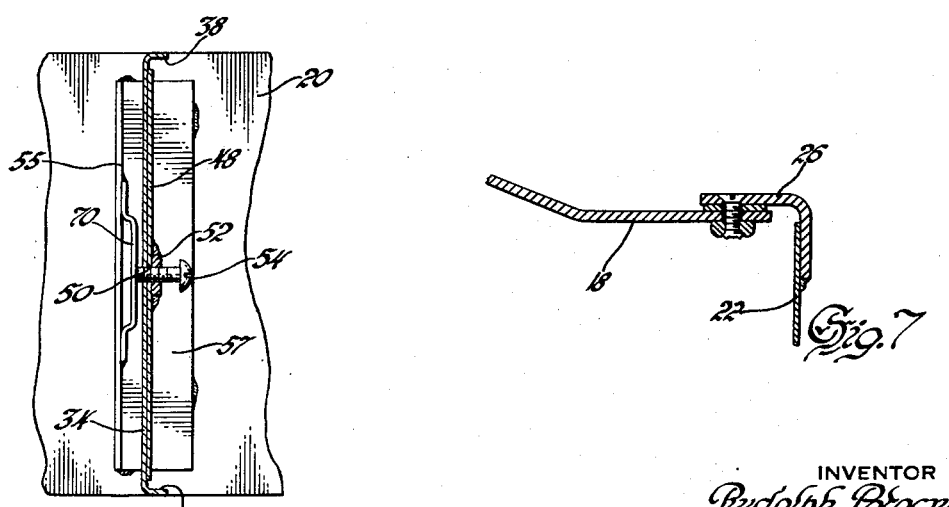
INVENTOR
Rudolph Potocnik
BY
Willits, Helwig & Baillio
ATTORNEYS

United States Patent Office 2,710,049
Patented June 7, 1955

2,710,049

CENTER ARM REST

Rudolph Potocnik, Detroit, Mich., assignor to General Motors Corporation, Detroit, Mich., a corporation of Delaware Application October 24, 1952, Serial No. 316,576

10 Claims. (Cl. 155—112)

This invention relates to arm rest constructions and more particularly to retractable center arm rests for vehicle seats.

It is well known in the art to provide a vehicle seat with a withdrawable center arm rest which is adapted for swinging movement in and out of a recess formed in a seat back. In the past, when such arm rests were moved into position for use an unsightly recess or notch in the back was exposed. In order to reestablish the smooth contour of the seat back when the arm rest is withdrawn downwardly it is desirable that a suitable mask or closure be disposed in a position covering the notch or recess.

It is therefore an object of this invention to provide withdrawable center arm rest having means operable upon movement thereof to the operative position to automatically mask the vacated portion of the opening from which it is withdrawn.

Another object is to provide a retractable arm rest of the type described wherein the mask is readily adjustable subsequent to the initial installation.

These and other objects and advantages of the invention will become more fully apparent when reference is had to the following description and drawings wherein:

Fig. 3 is a side elevational view, partly in section and with parts broken away, showing the mechanical linkage for the arm rest and the mask, and the position assumed thereby when the arm rest is in the position for use.

Fig. 4 is a reduced side elevational view showing the position of the arm rest and the mask linkage with relation to the seat frame when the arm is in the retracted position.

Fig. 5 is a plan view showing the arm rest linkage and mask linkage when the arm rest is in the position for use.

Fig. 6 is a sectional view taken substantially along line 6—6 of Fig. 3.

Fig. 7 is a fragmentary sectional view taken substantially along line 7—7 of Fig. 3.

Figure 1:
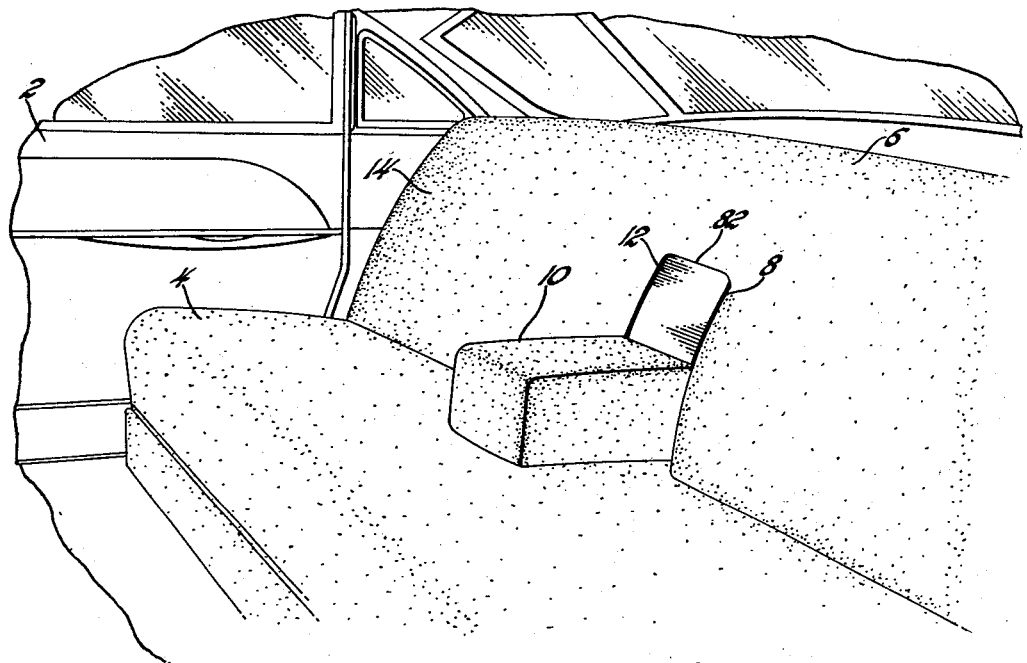
Fig. 1 is a perspective view of the interior of the rear of the vehicle showing a seat having a withdrawable center arm rest, the arm rest being in position for use and the mask being aligned to cover the recess in the seat back previously occupied by the arm rest.
Figure 2:
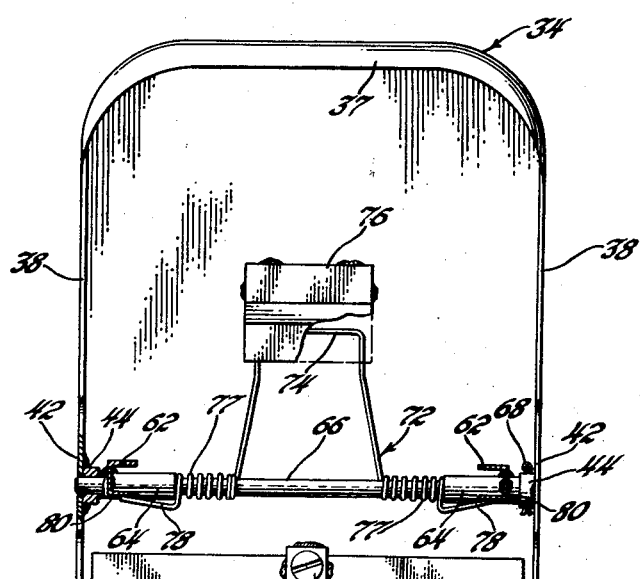
Fig. 2 is a rear plan view of the mask frame showing the pivotal and yieldable means of attachment to the arm rest framework.

Referring now to the drawings and particularly to Fig. 1, there is illustrated a perspective view of the interior portion of the rear of an automobile, wherein the reference numeral 2 designates an automobile body having mounted therein an upholstered bench type seat cushion 4 and an upholstered seat back 6 having a notch or recess 8 formed in the lower central portion thereof. Extending horizontally out of the lower portion of the central recess 8 in the seat back 6 and resting centrally on the cushion 4 is a padded rectangular center cushion 10 providing a center arm rest when the seat is occupied by two passengers and adapted to be swingably retracted into the elongated recess 8 formed in the seat back 6 when not in use or when it is desired to accommodate more passengers on the seat. Center cushion 10 is usually covered with upholstery material similar to that of the seat cushion 4 and seat back 6 in order to retain the harmony of line and color. Pivotally secured near the upper rear edge of the center arm rest 10 is a padded mask or closure 12 which is swingably movable to a position covering that portion of the recess 8 exposed upon movement of the center arm rest 10 into position for use. The padded mask 12 is covered in upholstery material matching that of the seat back and is intended to occupy substantially the same plane as the front surface 14 of the seat back 6. To this end adjustable means are provided for securing precise alignment of mask 12 with surface 14, when installed, or for correcting minor variations resulting from extended use.

As shown particularly in Figs. 3 and 4, the arm rest 10 is mounted for swingable movement in and out of the seat back recess 8 by spaced apart parallel links 16 and spaced apart parallel links 18 which are pivotally secured at their ends by means of bolts 21 or other suitable means to the arm rest frame 20 and the seat back supporting frame 22, respectively, to provide the compounds swinging motion necessary to allow withdrawal of the arm rest from the recess 8 and to place it in abutting relation with the upper surface of the cushion 4. Links 16 are pivotally attached at one end by the bolts 21 to transversely aligned brackets 24 welded or otherwise secured to the seat back frame 22 near the upper edge of the recess 8 and at their opposite ends to bracket 28 secured in any suitable manner to the arm rest frame 20. The links 18 are also pivoted at one end to bracket 28 slightly to the rear of the links 16 and at their other ends to transversely aligned bracket 26 welded or otherwise secured to the seat back frame 22 near the lower edge of the recess 8. Since links 16 are longer than links 18 and are pivoted ahead of the pivotal connections for links 18, it will be seen that when the arm rest 10 is swung upwardly it travels through an arcuate path generated from a progressively lowering point dictated by the continually changing angular position of links 16 and 18. When the arm rest 10 is swung upwardly into the notched recess 8 of seat back 6, the links 16 and 18 approach a position of substantial parallelism as seen particularly in Fig. 4. Conversely, when the arm rest 10 is swung downwardly from the recess 8, the links 16 move through an outwardly swinging path about their upper pivots while the links 18 describe a generally upward path of movement about their pivotal connection with seat back frame 22 until the arm rest 10 is positioned in approximately abutting relationship with the upper surface of the seat cushion 4. When the arm rest 10 is in substantial alignment with the cushion 4, further downward movement is arrested by a pair of holding brackets 30. Brackets 30 are secured in any suitable manner to the rear extremity of the arm rest frame 20 and are provided with downwardly extending arms 32 having hook portions 33 at the lower ends thereof which engage the lower edge of links 18 near their pivotal connections on bracket 26. The arm rest 10 is thus properly positioned and effectively held in operative position.

To mask the portion of the recess exposed when the arm rest 10 is withdrawn from the recess 8 into a horizontal position, a suitably shaped metal panel 34 is swingably mounted on a hinge bracket 36 secured to frame 20 near the upper edge of the latter. Panel 34 is formed of sheet metal and is provided with a rolled upper edge 37 and rearwardly flanged side edges 38. The side edges 38 of panel 34 are provided with transversely aligned widened portions 42 on which are welded or otherwise secured axially aligned bushings 44. At its lower edge, panel 34 is provided with a backwardly and upwardly bent relatively wide flange portion 48 having a centrally disposed aperture 50 formed therein. A threaded nut member 52 is disposed in alignment with the aperture 50 and is secured in position in any suitable manner, as by welding. Nut member 52 threadably receives an adjusting screw 54 which is adapted to extend through the aperture 50 formed in the panel 34. The inner end of screw 54 bears against an abutment plate 70 welded or otherwise secured to the flange 55 of an angle plate 57 which in turn is welded or otherwise secured to frame 20. The purpose of screw 54 will presently appear. Bracket 36 may be constructed of sheet metal and comprises a central body portion 56 which extends transversely across frame 20 near the rear edge thereof and is secured thereto by a plurality of machine screws 58. At either side thereof bracket 36 is provided with bent-up flanged arms 60 having forwardly extending finger portions 62. Forwardly extending finger portions 62 have welded thereto axially aligned bushings 64 which are adapted to be positioned in abutting relation and in axial alignment with the bushings 44 secured to metal panel 34. To attach panel 34 to hinge bracket 36, a cross shaft 66 is inserted through the four aligned bushings 44 and 64. Shaft 66 is held against axial movement by a cotter pin 68. It is apparent from the foregoing description that panel 34 is swingable clockwise from a position substantially parallel with the upper surface of arm rest 10 to a position at substantially right angles thereto. To yieldably urge panel 34 into the position of alignment with seat back 6, as shown in Fig. 3, a spring member 72 is provided. Spring 72 is mounted on the cross shaft 66 and is provided with an upwardly extending U-shaped center portion 74 adapted to engage a retaining plate 76 welded centrally on the rear face of the metal panel 34. Extending outwardly from each side of center portion 74, spring 72 is provided with a plurality of helical turns 77 terminating in outwardly and backwardly bent arm portions 78 which engage the lower surfaces 80 of the hinge arms 60. Spring 72 is tensioned before assembly to provide clockwise tension, and accordingly metal panel 34 will be yieldingly urged to the position shown in Fig. 3, but may be manually swung forwardly and downwardly against the action of the spring 72.

To correct slight variations inherent in volume production of vehicle seats, adjusting screw 54 may be manipulated to vary the angle of inclination of panel 34 to conform to the angle of inclination of the particular seat back in which it is installed. It will be apparent that slight differences in the amount of padding or in the construction of the spring framework will cause variation in contour from one seat to another. To adjust the panel 34 to compensate for these variations, it is only necessary to grasp the upper edge 82 of the panel and swing it forwardly after the arm rest 10 is in position for use. Thereafter, by adjusting the screw 54 either in or out, as the case may be, the angle of inclination of the panel 34 may be modified to correspond to the angle of inclination of the particular seat back. When released after making any necessary adjustment, the cover panel 34 will swing back into the position shown in Fig. 3 in response to the urging of spring member 72.

When the arm rest 10 is retracted into the recess 8 of the seat back 6, initial upward movement of the arm rest causes the cover panel 34 to move bodily rearwardly into the recess 8 until the upper edge 82 of the panel reaches the front surface 86 of seat back frame 22. Since the mask or closure member 34 is spring biased in a clockwise direction, as seen from the left, it will be apparent that upon continued rearward movement of the arm rest into the recess, the said closure member will pivot about shaft 66 against the action of spring 72 thereby permitting further movement of the arm rest in said recess until it assumes the position shown in Fig. 4. The closure member will swing counterclockwise relative to the hinge bracket 36 since the upper edge 82 maintains sliding contact with the surface 86 of frame 22. When the arm rest 8 is fully retracted in recess 10, as shown in Fig. 4, the closure member 34 will occupy a plane substantially parallel with the upper surface of said arm rest in the space between the upper surface thereof and the front surface 86 of seat frame 22.

From the foregoing it will be seen that there has been provided a normally recessed center arm rest structure for a vehicle seat which, when withdrawn from the seat back for use, automatically masks the aperture normally exposed upon withdrawal, thereby retaining the original smooth contour of the seat back. In addition, the invention provides for easy initial adjustment and for any subsequent readjustment which may be occasionally required.

While but a single embodiment of the invention has been shown and described, it is apparent that certain changes and modifications may be made therein without departing from the spirit of the invention. It is therefore to be understood that it is not intended to limit the invention to the single embodiment disclosed but only by the scope of the claims which follow.

I claim:

1. In a device of the class described, the combination of a seat back having a recess formed therein, an arm rest movable from said recess to an arm supporting position, and adjustable closure means for masking the portion of said recess vacated by said arm rest.

2. In a device of the class described, the combination of a seat back having a recess formed therein, an arm rest movable from said recess to an arm supporting position, and adjustable closure means pivotally mounted on said arm rest for masking the portion of said recess vacated by said arm rest.

3. In a device of the class described, the combination of a seat back having a recess formed therein, an arm rest movable from said recess to an arm supporting position, a bracket on said arm rest, and adjustable closure means for masking the portion of said recess vacated by said arm rest, said closure means comprising a panel secured to said bracket and resilient means urging said panel to a predetermined angle relative to said arm rest.

4. In a device of the class described, the combination of a seat back having a recess formed therein, an arm rest movable from said recess to an arm supporting position, spring urged closure means for masking the portion of said recess vacated by said arm rest, and means for adjusting the position of said closure means, comprising, an abutment plate on said arm rest and a threadably adjustable member on said panel adapted to engage said plate.

5. In a device of the class described, the combination of a seat back having a recess formed therein, an arm rest movable from said recess to an arm supporting position, adjustable closure means for masking the portion of said recess vacated by said arm rest, said closure means comprising a panel, a bracket secured on said arm rest, a shaft pivotally connecting said panel to said bracket and resilient means urging said panel to a predetermined angle relative to said arm rest, and means for varying said predetermined angle, comprising, an abutment plate on said arm rest and a threadably adjustable member on said panel adapted to engage said plate.

6. In a device of the class described, the combination of a substantially vertical seat back having a recess formed centrally therein, a padded arm rest swingably movable from said recess to a horizontally extending arm supporting position, an adjustable closure member carried by said arm rest and operable upon movement of said arm rest for masking the portion of said recess vacated by said arm rest, and means carried by said closure member and engagable with said arm rest for adjusting the angularity of said padded member with reference to the contour of the forward surface of said seat back.

7. In a device of the class described, the combination of a seat back having a substantially vertical forward surface thereon, a recess formed centrally in said seat back, a padded arm rest pivotally secured in said notched recess and swingably movable therefrom to a horizontally extending arm supporting position, a hinged closure carried by said arm rest, yieldable means operable upon movement of said arm rest to an extended position to swingably urge said closure into a position masking that portion of said recess vacated by said arm rest and threadable means carried by said closure for modifying the plane occupied by said closure when said arm rest is in the horizontally extended position.

8. In a device of the class described, the combination of a seat back having a substantially vertical forward surface thereon and a recess formed centrally therein, a padded arm rest pivotally secured in said notched recess and swingably movable therefrom to a horizontally extending arm supporting position, a hinged panel carried by said arm rest, yieldable means operable upon movement of said arm rest to an extended position to swingably urge said panel into a position masking that portion of said recess vacated by said arm rest and threadable means carried by said panel for modifying the plane occupied by said panel when said arm rest is in the horizontally extended position, said threadable means being concealed when said arm rest is in the horizontally extended position.

9. In a device of the class described, the combination of a substantially vertical seat back having an upholstered flexible forward surface, a vertically elongated recess disposed centrally in said seat back, an arm rest having an upholstered flexible covering corresponding to said seat back surface and adapted to occupy said recess, link means permitting said arm rest to be swingably moved from said recess to a horizontally extending arm supporting position, a metal panel hingedly supported on the rear upper edge of said arm rest, said panel being covered in upholstery material corresponding to said arm rest, spring means yieldingly urging said panel in a clockwise direction about said hinge support, stop means integral with said arm rest limiting the clockwise movement of said panel, said panel being adapted to mask the portion of said recess vacated by said arm rest upon movement of said arm rest to the horizontally extending position, and means adjustable upon manual counterclockwise movement of said panel for adjusting the angularity of said panel to conform to the contour of the forward surface of said seat back.

10. In a device of the class described, the combination of a substantially vertical seat back having a recess formed in the lower central portion thereof, a padded arm rest swingably movable from said recess to a horizontally extending arm supporting position, means engaging said arm rest limiting downward swinging movement beyond the horizontally extending position, a closure member pivotally carried on the upper rear edge of said arm rest, said closure being movable with said arm rest from a substantially parallel collapsed position to a substantially right angled position upon movement of said arm rest from said recess to said horizontally extending position, means yieldably urging said panel into said substantially right angled position, and means operable upon movement of said closure to a substantially horizontal position for varying the substantially right angled position.

References Cited in the file of this patent

UNITED STATES PATENTS

| | | |
|---|---|---|
| D. 156,199 | Cadwallader | Nov. 29, 1949 |
| 1,835,049 | Hottel | Dec. 8, 1931 |
| 1,845,401 | Dietrich | Feb. 16, 1932 |
| 2,085,836 | Tatum | July 6, 1937 |
| 2,204,205 | Bell | June 11, 1940 |
| 2,584,481 | Mast et al. | Feb. 5, 1952 |

FOREIGN PATENTS

| | | |
|---|---|---|
| 327,905 | Great Britain | Apr. 17, 1930 |